(12) United States Patent
Fukase et al.

(10) Patent No.: US 11,459,252 B2
(45) Date of Patent: Oct. 4, 2022

(54) AEROBIC BIOLOGICAL TREATMENT APPARATUS

(71) Applicant: KURITA WATER INDUSTRIES LTD., Tokyo (JP)

(72) Inventors: Tetsurou Fukase, Tokyo (JP); Hideki Kobayashi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 16/963,340

(22) PCT Filed: Jan. 28, 2019

(86) PCT No.: PCT/JP2019/002695
§ 371 (c)(1),
(2) Date: Jul. 20, 2020

(87) PCT Pub. No.: WO2019/159667
PCT Pub. Date: Aug. 22, 2019

(65) Prior Publication Data
US 2021/0061688 A1   Mar. 4, 2021

(30) Foreign Application Priority Data
Feb. 15, 2018 (JP) .............................. JP2018-025233

(51) Int. Cl.
C02F 3/26 (2006.01)
C02F 3/20 (2006.01)
C02F 3/08 (2006.01)

(52) U.S. Cl.
CPC ................ C02F 3/08 (2013.01); C02F 3/208 (2013.01); C02F 3/26 (2013.01)

(58) Field of Classification Search
CPC ........ B01D 63/02; B01D 69/00; B01D 65/02; B01D 65/08; B01D 69/08;
(Continued)

(56) References Cited

U.S. PATENT DOCUMENTS 4,883,594 A * 11/1989 Sekoulov .................. C02F 3/30
                                                        210/603
5,034,164 A    7/1991 Semmens
(Continued)

FOREIGN PATENT DOCUMENTS

CN        104030455 A    9/2014
CN        106927560 A    7/2017
(Continued)

OTHER PUBLICATIONS

Japan Patent Office, "Office Action for Japanese Patent Application No. 2019-223738," dated Dec. 1, 2020.
(Continued)

Primary Examiner — Claire A Norris
(74) Attorney, Agent, or Firm — Manabu Kanesaka (57) ABSTRACT

An aerobic biological treatment apparatus includes a reaction tank (tank body), a water permeation plate horizontally installed in a lower part of the reaction tank, a large-diameter particle layer formed on an upper side of the water permeation plate, a small-diameter particle layer formed on an upper side of the large-diameter particle layer, an oxygen dissolution membrane module disposed on an upper side of the small-diameter particle layer, a receiving chamber formed on a lower side of the water permeation plate, a raw water dispersion pipe supplying raw water into the receiving chamber, a diffuser pipe installed to perform gas diffusion in the receiving chamber and the like. A condensed water drainage pipe branches from an exhaust pipe from the oxygen dissolution membrane module, and a valve is provided.

11 Claims, 4 Drawing Sheets

(58) Field of Classification Search
CPC ........ B01D 2321/185; B01F 1/00; B01F 3/04;
B01F 5/06; B01F 1/0038; B01F 3/04248;
Y02W 10/10; C02F 1/44; C02F 3/08;
C02F 3/26; C02F 3/208; C02F 3/085;
C02F 3/102; C02F 3/1273; C02F 3/20;
C02F 3/201
USPC ................ 210/600, 620, 321.6, 500.21, 150,
210/615–618
See application file for complete search history.

(56) References Cited

U.S. PATENT DOCUMENTS

| | | |
|---|---|---|
| 7,140,495 B2 | 11/2006 | Hester et al. |
| 10,781,119 B2 | 9/2020 | Cote et al. |
| 2002/0020666 A1 | 2/2002 | Cote et al. |
| 2018/0022625 A1 | 1/2018 | Cote et al. |
| 2018/0078909 A1 | 3/2018 | Oi et al. |

FOREIGN PATENT DOCUMENTS

| | | | |
|---|---|---|---|
| JP | S64-90093 | A | 4/1989 |
| JP | H04-371298 | A | 12/1992 |
| JP | H05-068996 | A | 3/1993 |
| JP | H06-34785 | U | 5/1994 |
| JP | H06-507335 | A | 8/1994 |
| JP | H07-60275 | A | 3/1995 |
| JP | 2000-189742 | A | 7/2000 |
| JP | 2005-511303 | A | 4/2005 |
| JP | 2006-087310 | A | 4/2006 |
| KR | 100840199 | B1 * | 6/2008 |
| TW | 201522242 | A | 6/2015 |
| WO | 2014/130043 | A1 | 8/2014 |
| WO | 2016/167134 | A1 | 10/2016 |
| WO | 2016/209235 | A1 | 12/2016 |

OTHER PUBLICATIONS

PCT/ISA/210, "International Search Report for International Application No. PCT/JP2019/002695," dated Apr. 9, 2019.
Japan Patent Office, "Notice of Reasons for Refusal for Japanese Patent Application No. 2018-025233," dated Mar. 29, 2019.
Japan Patent Office, "Notice of Reasons for Refusal for Japanese Patent Application No. 2018-025233," dated Oct. 8, 2019.
Japan Patent Office, "Notification of reasons for rescission for Japanese Patent Application No. 2020-700945," dated Mar. 3, 2021.
Tamaki, A. et al., "Chemical plant construction handbook," Apr. 1992, p. 686, Maruzen, Tokyo, Japan.
"Practical knowledge of air conditioning facility planning and design," Air Conditioning and Sanitary Engineering Society, Mar. 30, 1995, p. 243, p. 283, Ohmsha, Ltd., Tokyo, Japan.
Japan Patent Office, "Opposition for Japanese Patent No. 6702344," dated Dec. 3, 2020.
Thomas E. Kunetz, et al., "Innovative Membrane-Aerated Biofilm Reactor Pilot Test to Achieve Low-energy Nutrient Removal at the Chicago MWRD," Proceedings of the Water Environment Federation, Jan. 2016, vol. 14, pp. 2973-2987.
Xin Wei, et al., "COD and nitrogen removal in facilitated transfer membrane-aerated biofilm reactor (FT-MABR)," Journal of Membrane Science, 2012, vol. 389, pp. 257-264.
Korean Intellectual Property Office, "Office Action of Korean Patent Application of 10-2020-7010327," dated Apr. 7, 2022.
China National Intellectual Property Administration, "Office Action for Chinese Patent Application 201980005568.3," dated Jun. 6, 2022.
China National Intellectual Property Administration, Search Report for Chinese Patent Application 201980005568.3, dated May 27, 2022.
Hu et al., "Water Treatment Device," Hefei University of Technology Press, p. 74, Jul. 31, 2010.
Taiwan Intellectual Property Office, "Office Action for Taiwanese Patent Application 108103927," dated Jul. 22, 2022.

* cited by examiner

AEROBIC BIOLOGICAL TREATMENT APPARATUS

TECHNICAL FIELD

The present invention relates to an aerobic biological treatment apparatus for organic wastewater.

BACKGROUND ART

An aerobic biological treatment method is inexpensive, and therefore is frequently used as a treatment method for organic wastewater. In this method, dissolution of oxygen into water to be treated is necessary, and aeration by a diffuser pipe is usually performed.

Dissolution efficiency of aeration by a diffuser pipe is about 5 to 20%, which is low. Further, it is necessary to aerate with a pressure equal to or more than a water pressure applied to a water depth where the diffuser pipe is installed, and a large quantity of air is fed at a high pressure, so that electric power cost of a blower is high. Usually, two-thirds or more of the electric power cost in the aerobic biological treatment is used for oxygen dissolution.

A membrane aeration bioreactor (MABR) that performs aerobic biological treatment by attaching biofilms to the outside of hollow fiber membranes and supplying oxygen from the inside can dissolve oxygen without generating bubbles. In MABR, air can be passed at a pressure lower than the water pressure applied to the water depth, so that the pressure required for the blower is low, and dissolution efficiency of oxygen is high.

PTL 1: JP 2006-87310 A

In MABR, condensed water is generated inside oxygen dissolution membranes due to penetration of water vapor from the reaction tank and condensation of water vapor in passing gas, the gas flow path and some of the hollow fiber membranes are blocked, and gas passage efficiency is reduced.

In other words, the amount of air passing through the hollow fiber membranes of MABR is small, and in hollow fiber oxygen dissolution membranes ordinarily used, the air flow rate in the hollow fibers is 1 mm/sec or less, which is extremely slow. Accordingly, when only a small amount of condensed water enters some of the hollow fibers, a large pressure difference from the other hollow fibers occurs, and the flow of gas stops. When a large amount of condensed water accumulates in a header pipe, a large amount of condensed water enters into the hollow fibers, so that many hollow fibers are unable to pass air, and oxygen dissolution efficiency is reduced greatly.

In Patent Literature 1, a large number of hollow fiber membranes are arranged in an up-down direction, and air is supplied to the respective hollow fiber membranes from a lower side by a compressor. If the condensed water is tried to be discharged to outside of the hollow fiber membranes by the air pressure in the MABR of Patent Literature 1, a compressor with a higher pressure which is equal to or higher than the water pressure of the reaction tank is required as the compressor, and in addition, the power consumption amount is extremely increased.

SUMMARY OF INVENTION

The present invention has an object to provide an aerobic biological treatment apparatus that enables condensed water to be easily discharged from inside of oxygen dissolution membranes, and can maintain high oxygen dissolution efficiency for a long time period.

An aerobic biological treatment apparatus of the present invention includes a reaction tank, an oxygen dissolution membrane module installed in the reaction tank so that a gas passage direction is in an up-down direction, oxygen-containing gas supply means for supplying oxygen-containing gas to the oxygen dissolution membrane module, an exhaust gas pipe that discharges exhaust gas to outside of the reaction tank from the oxygen dissolution membrane module, and a water drainage pipe that discharges condensed water to outside of the reaction tank from the oxygen dissolution membrane module.

In one aspect of the present invention, the aerobic biological treatment apparatus is provided to discharge condensed water to a position lower than a lower end of the oxygen dissolution membrane module (when using a plurality of modules, lower than a lower end at a lowermost position among lower ends of the respective modules), and discharge the condensed water discharged from the oxygen dissolution membrane module to outside of the tank.

In one aspect of the present invention, the water drainage pipe is provided to be in a vertically downward direction or to have a downward gradient.

In one aspect of the present invention, an inside diameter of the water drainage pipe is 50 mm or less, and a downstream end of the water drainage pipe is disposed at a higher position than an upper end of the oxygen dissolution membrane module.

One aspect of the present invention includes a tank that receives condensed water flowing out of the water drainage pipe, and a pump that feeds water in the tank to the reaction tank.

In one aspect of the present invention, a valve is provided in the water drainage pipe.

In one aspect of the present invention, the oxygen dissolution membrane module includes a nonporous oxygen dissolution membrane.

In one aspect of the present invention, an oxygen dissolution membrane is hydrophobic.

In one aspect of the present invention, the reaction tank is filled with a fluidized bed carrier.

Advantageous Effects of Invention

In the aerobic biological treatment apparatus of the present invention, gas is passed in an up-down direction through the oxygen dissolution membrane module, and condensed water of the oxygen dissolution membrane module is discharged to outside of the reaction tank through the water drainage pipe, so that condensed water is quickly discharged to outside of the reaction tank from the oxygen dissolution membrane. Accordingly, oxygen dissolution efficiency of the oxygen dissolution membranes can always be highly maintained.

DESCRIPTION OF EMBODIMENTS

Hereinafter, the present invention will be described in more detail with reference to the drawings.

Figure 1:
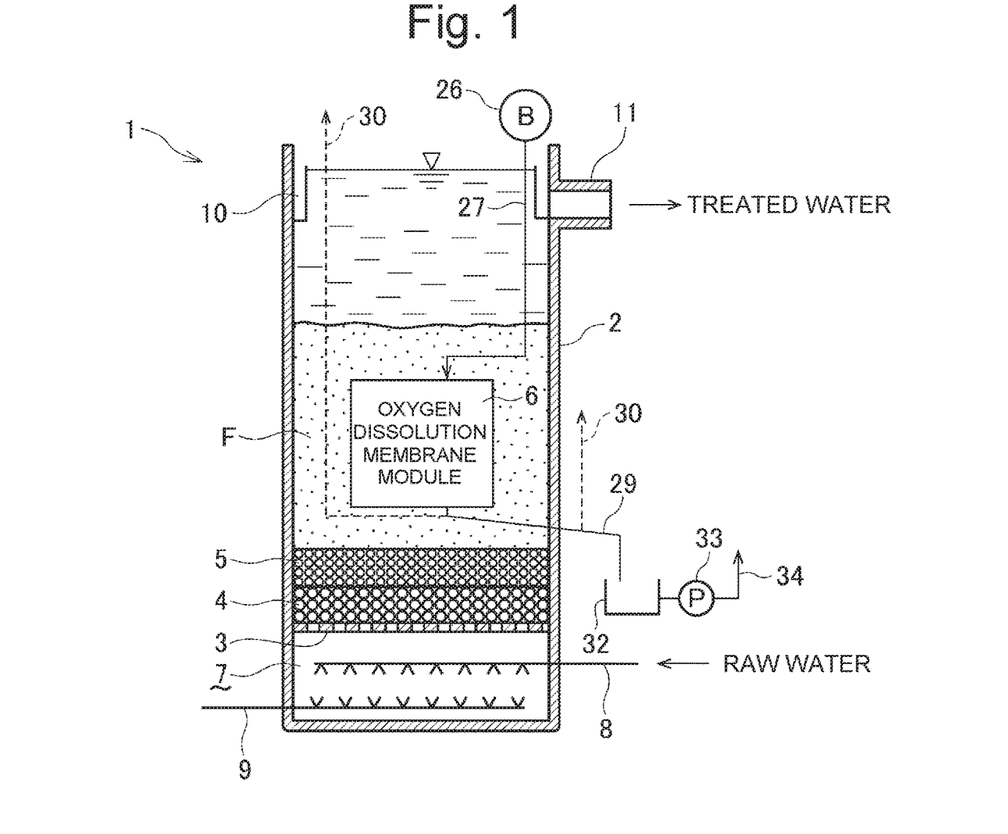
FIG. 1 is a vertical sectional view of a biological treatment apparatus according to an embodiment.

FIG. 1 is a vertical sectional view of an aerobic biological treatment apparatus 1 according to an embodiment. The aerobic biological treatment apparatus 1 has a reaction tank (tank body) 2, a water permeation plate 3 formed of a porous plate such as a punching plate installed horizontally in a lower part of the reaction tank 2, a large-diameter particle layer 4 formed on an upper side of the water permeation plate 3, a small-diameter particle layer 5 formed on an upper side of the large-diameter particle layer 4, a fluidized bed F formed on an upper side of the small-diameter particle layer 5 by filling of bioadhesive carriers such as granular activated carbon, an oxygen dissolution membrane module 6 at least partially disposed in the fluidized bed F at a time of being deployed, a receiving chamber 7 formed on a lower side of the water permeation plate 3, a raw water dispersion pipe 8 supplying raw water into the receiving chamber 7, a cleaning pipe 9 to which gas or the like for backwash is supplied at a time of cleaning of the filled layers, and the like. In an upper part of the reaction tank 2, a trough 10 and an outlet 11 are installed to allow the treated water to flow out. The trough 10 forms an annular flow path along a tank inner wall.

FIG. 1 shows that the reaction tank is filled with fluidized bed carriers, and adhesion of biofilms to surfaces of the oxygen dissolution membranes is suppressed by a shearing force by fluidization of the carriers so that most of the biofilms adhere to the fluidized bed carriers, and the oxygen dissolution membranes are used only for the purpose of oxygen supply. Though not illustrated, when the reaction tank is not filled with the fluidized bed carriers, the oxygen dissolution membranes act as MABR. In other words, biofilms adhere to the surfaces of the oxygen dissolution membranes, oxygen that is dissolved and supplied from a primary side of the oxygen dissolution membranes are consumed by biofilms at a secondary side, and aerobic biological treatment is performed.

In FIG. 1, nonporous (non-porous) oxygen dissolution membranes are used as the oxygen dissolution membranes, oxygen-containing gas is passed to the primary side of the oxygen dissolution membranes through a pipe from outside of the tank, and exhaust gas is discharged to outside of the tank through a pipe. Accordingly, the oxygen-containing gas is passed to the oxygen dissolution membranes at a low pressure, oxygen is passed as oxygen molecules among constituent atoms of the oxygen dissolution membranes (dissolved in the membranes), and is brought into contact with water to be treated as oxygen molecules. Since oxygen is directly dissolved in water, air bubbles are not generated. The method uses a mechanism of molecular diffusion by concentration gradient, and diffusion by a diffuser pipe or the like as in the conventional method is not required.

It is preferable to use a hydrophobic material as the material of the oxygen dissolving membrane because it is difficult for water to penetrate the membrane. A very small amount of water inevitably penetrates even a hydrophobic membrane.

Figure 2:
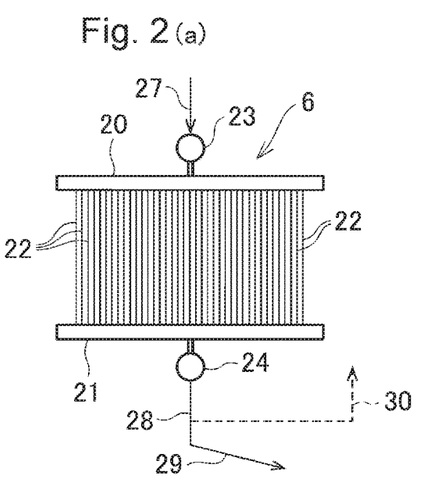
FIG. 2(a) is a side view of an oxygen dissolution membrane unit.
FIG. 2(b) is a perspective view of an oxygen dissolution membrane unit.
Figure 3:
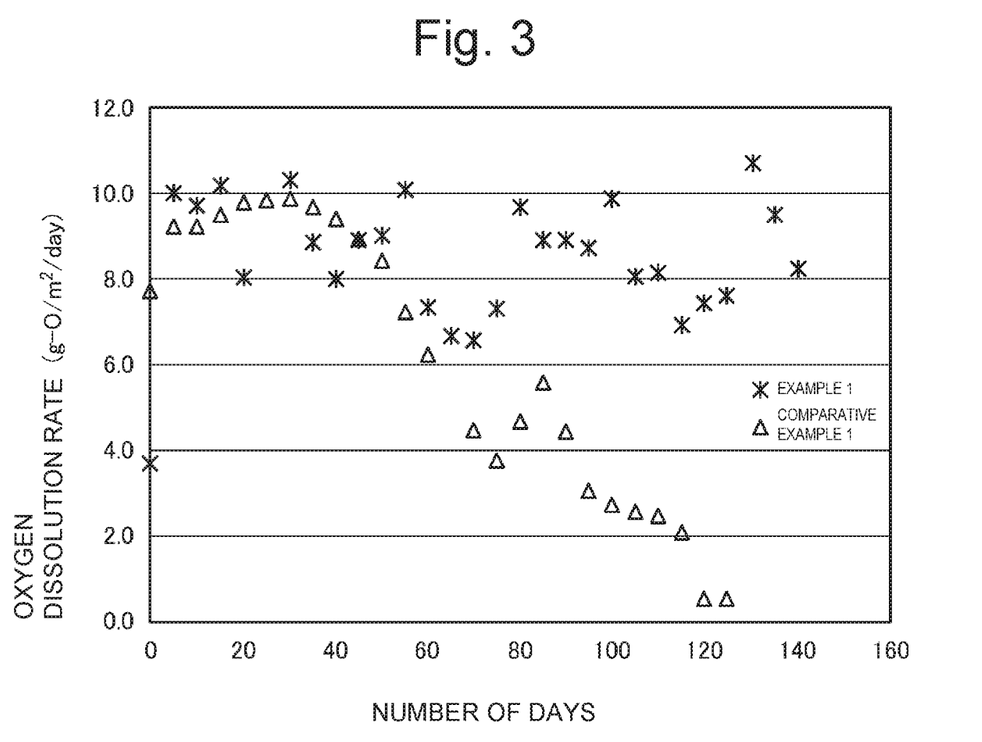
FIG. 3 is a graph showing an experimental result.

FIGS. 2(a) and 2(b) show one example of the oxygen dissolution membrane module 6 in the embodiment in FIG. 1. The oxygen dissolution membrane module 6 uses a hollow fiber membrane 22 as the oxygen dissolution membrane. In the embodiment, the hollow fiber membranes 22 are arranged in an up-down direction, upper ends of the respective hollow fiber membranes 22 connect to an upper header 20, and lower ends connect to a lower header 21. Insides of the hollow fiber membranes 22 respectively communicate with insides of the upper headers 20 and the lower headers 21. The respective headers 20 and 21 are in hollow-pipe shapes. Note that in the case of using flat membranes or spiral membranes, these membranes are arranged so that gas passing directions are in the up-down direction.

As in FIG. 2(b), a plurality of units each formed of a pair of headers 20 and 21 and the hollow fiber membranes 22 are arranged in parallel. As in FIG. 2(a), it is preferable that an upper manifold 23 is connected to upper portions of the respective upper headers 20 via piping, and a lower manifold 24 is connected to lower portions of the respective lower headers 21 via piping. In the case of the embodiment in FIG. 1, oxygen-containing gas is supplied to an upper portion of the oxygen dissolution membrane module 6, and is discharged from a lower portion of the oxygen dissolution membrane module 6. Oxygen-containing gas such as air passes through the hollow fiber membranes 22 from the upper headers 20 to flow to the lower headers 21, and oxygen permeates through the hollow fiber membranes 22 during this while to dissolve into water in the reaction tank 2.

The respective headers 20 and 21 and the respective manifolds 23 and 24 may be provided to have a running water gradient. The oxygen dissolution membrane module 6 may be vertically installed in multiple stages.

In the embodiment in FIG. 1, a blower 26 and a gas supply pipe 27 for supplying air are provided (configuring oxygen-containing gas supply means) to supply air to the oxygen dissolution membrane module 6, and the gas supply pipe 27 is connected to the upper manifold 23. A relay pipe 28 for exhaust gas is connected to the lower manifold 24. A discharge pipe 29 is connected to the relay pipe 28. The discharge pipe 29 is provided to have a downward gradient (including vertical downward), and is extended to outside of the reaction tank 2. In FIG. 1, the discharge pipe 29 is drawn sideward of the reaction tank 2, but may be drawn downward from a bottom portion of the reaction tank 2.

As in FIG. 1, remainder of the oxygen-containing gas that is not dissolved in the oxygen dissolution membrane is exhausted out of the tank through the discharge pipe 29. A downstream end of the pipe 29 is disposed to be at a lower position than a lower end of the oxygen dissolution membrane module 6 (in the case of a plurality of modules 6, a lower end at a lowermost position of lower ends of the respective modules). Accordingly, when exhaust gas contains condensed water, the condensed water flows out to a tank 32 downward of the discharge pipe 29. The water in the tank 32 may be fed to the reaction tank 2 by a pump 33 and a pipe 34.

In the above described configuration, the discharge pipe 29 serves as both an exhaust gas pipe that discharges exhaust gas out of the tank and a water drainage pipe that discharges condensed water out of the tank. In the tank or outside the tank, the exhaust gas pipe 30 that discharges exhaust gas out of the tank may be connected to the discharge pipe 29. In this case, condensed water is discharged through the discharge pipe 29. A downstream end of the exhaust gas pipe 30 may be disposed at a position higher than the lower end of the oxygen dissolution membrane module. In order to prevent condensed water from accumulating, the exhaust gas pipe 30 is preferably configured not to have a downward gradient but to have only an upward gradient or to be in only a vertical upward direction. A valve A (not illustrated) may be provided at a downstream side from a branch point of the discharge pipe 29 with the exhaust gas pipe 30, so that the condensed water flows out to the tank 32 by opening the valve A. Further, a valve C (not illustrated) may be also provided in the exhaust gas pipe 30, the valve A may be closed whereas the valve C may be opened at the time of normal gas passage, and when the condensed water is discharged, the valve A may be opened whereas the valve C may be closed.

The valves may be either automatic valves or manual valves. Valve opening for discharging the condensed water may be in a continuous mode or an intermittent mode. In a case of the intermittent mode, in a normal operation, water is drained by opening the valve from once a day to once every 30 days (at most once a day for several seconds, and at least once a month for several tens of seconds), and preferably from once a day to once every 15 days.

In the aerobic biological treatment apparatus 1 configured in this way, raw water is introduced into the receiving chamber 7 through the dispersion pipe 8, is passed in an upward flow through the water permeation plate 3 and the large-diameter and small-diameter particle layers 4 and 5 with SS filtered, subsequently in the fluidized bed F of the granular activated carbon with biofilm attached, the water is passed in an upward flow in a one-pass mode to perform biological reaction, and is taken out as treated water through the trough 10 and the outlet 11 from an upper clear area.

The oxygen-containing gas such as air supplied from the gas supply pipe 27 is passed in a downward flow in the oxygen dissolution membrane module 6, thereafter, flows out from a lower end position of the oxygen dissolution module 6 via the lower headers 21 and the lower manifold 24, and the exhaust air is discharged into the atmosphere from the discharge pipe 29 (or from the exhaust gas pipe 30 when the exhaust gas pipe 30 is provided). The condensed water flows out to the tank 32 through the discharge pipe 29.

Figure 4:
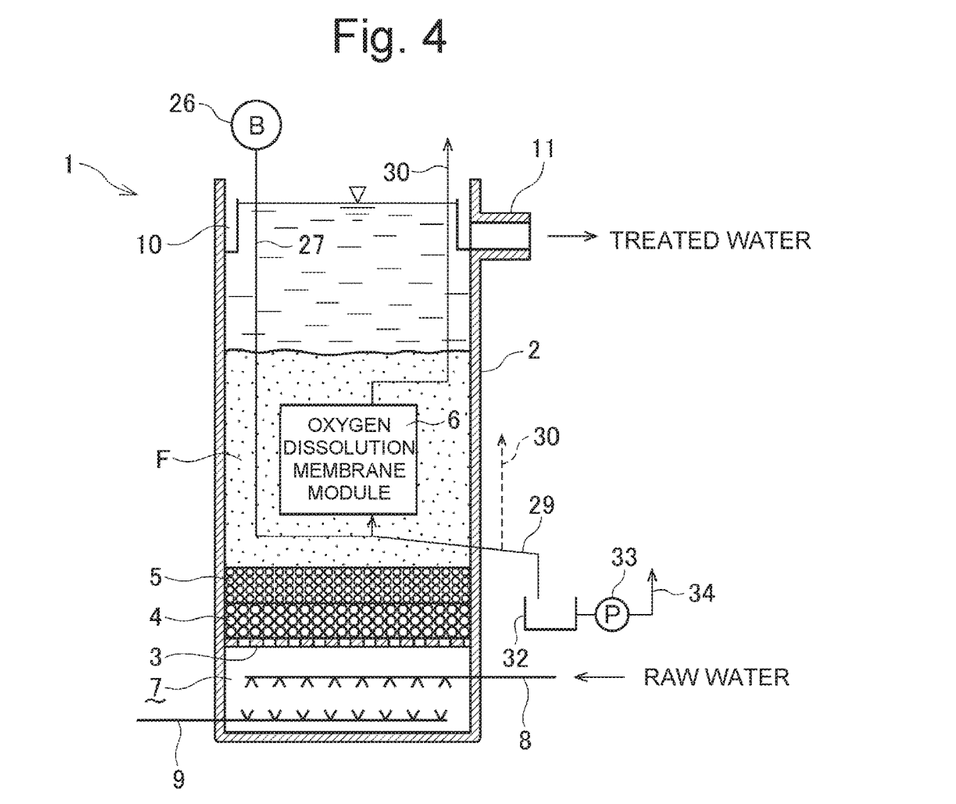
FIG. 4 is a vertical sectional view of a biological treatment apparatus according to another embodiment.
Figure 5:
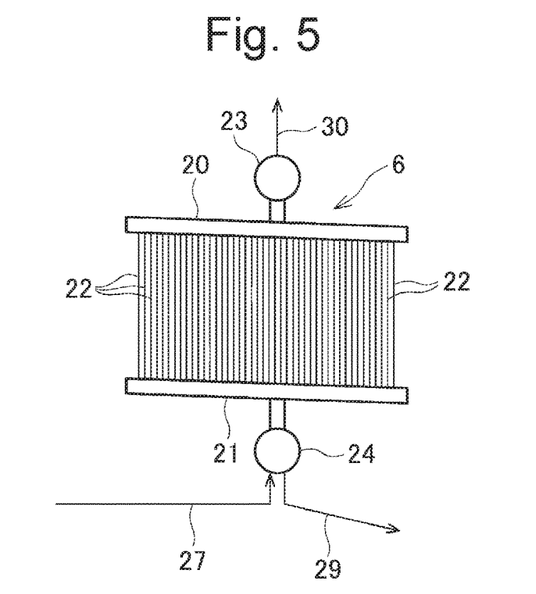
FIG. 5 is a configurational view of an oxygen dissolution membrane unit in FIG. 4.

FIGS. 4 and 5 show another embodiment. In this embodiment, pipes 27 and 30 are provided to pass the oxygen-containing gas such as air in an upward flow through the oxygen dissolution membrane module 6. The other configurations are the same as in FIG. 1, and same reference signs denote the same parts. The Condensed water is likely to stay in the lower headers 21 and the lower manifold 24, but the condensed water is regularly discharged through the discharge pipe 29, and therefore the membrane can be prevented from being subjected to gas passage inhibition by the condensed water.

A valve A is provided in the discharge pipe 29, whereas a valve C is provided in the exhaust gas pipe 30, gas is exhausted by closing the valve A and opening the valve C at the time of normal gas passage, and at the time of discharge of condensed water, the condense water is discharged with exhaust gas by opening the valve A and closing the valve C.

Figure 6:
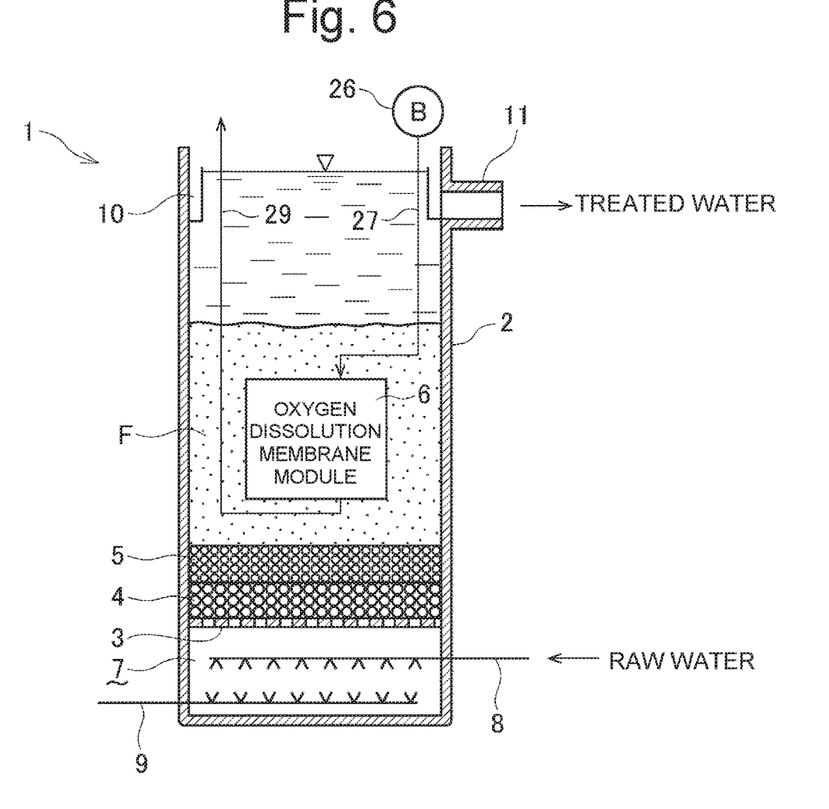
FIG. 6 is a vertical sectional view of a biological treatment apparatus according to still another embodiment.
Figure 7:
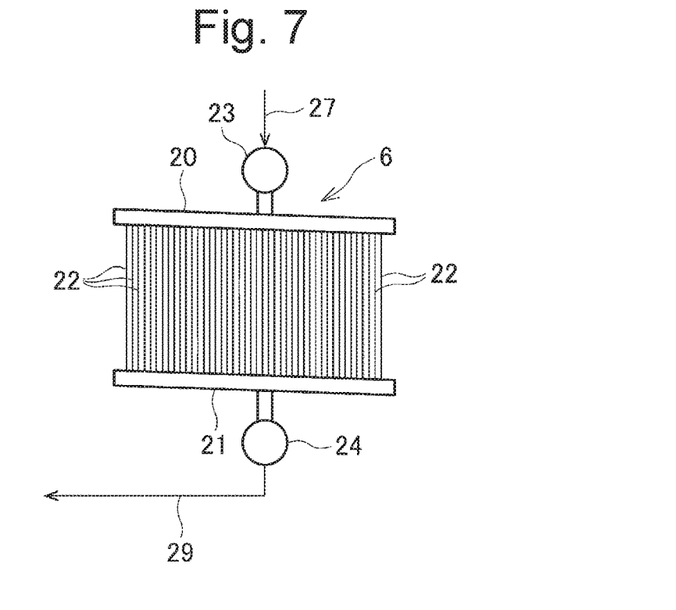
FIG. 7 is a configurational view of an oxygen dissolution membrane unit in FIG. 6.

FIGS. 6 and 7 show still another embodiment. A discharge pipe 29 serving as both an exhaust gas pipe and a water drainage pipe is installed. The pipe 29 is disposed so that a downstream end of the pipe 29 is at a position higher than an upper end of the oxygen dissolution membrane, in particular, on a water surface in a tank or in a vicinity of the water surface (water surface±approximately 1 m). The other configurations are the same as in FIG. 1, and the same reference signs denote the same parts.

The condensed water existing from the lower headers of the oxygen dissolution membrane to the lower manifold is discharged out of the tank or to the vicinity of the water surface with exhaust gas through the discharge pipe 29 (in this case, an inside diameter of 50 mm or less) by gas passage at approximately LV 10 to 20 m/s. When a downstream end of the discharge pipe 29 is in the vicinity of the water surface, an influence on supply pressure of a blower is small because water pressure is low.

When the hollow fiber membranes are used as the oxygen dissolution membranes, entry of condensed water easily inhibits gas passage and has a large effect because sectional areas of gas passage portions are small, so that the present invention can be more preferably used in an aerobic biological treatment apparatus in which the oxygen dissolution membranes are the hollow fiber membranes.

In the present invention, the supply oxygen amount increases by installing non-porous oxygen dissolution membranes on the fluidized bed of a biological carrier such as activated carbon, and therefore, there is no upper limit for an organic wastewater concentration of target raw water.

Further, since the biological carrier is operated on the fluidized bed, the biological carrier is not subjected to severe disturbance. Accordingly, a large amount of organisms can be stably maintained, and therefore a high load can be taken.

Further, since the oxygen dissolution membranes are used in the present invention, oxygen dissolution power is small as compared with pre-aeration, and direct aeration.

Form these facts, according to the present invention, it is possible to treat organic wastewater from a low concentration to a high concentration with a high load and at low cost.

<Biological Carrier>

As the biological carrier, activated carbon is preferable.

The fill amount of the fluidized bed carrier is preferably around 40 to 60% of a volume of the reaction tank, substantially 50% in particular. As the fill amount is larger, the amount of organisms is larger and activation is higher, but when the fill amount is too large, there arises a fear of flowout. Accordingly, it is preferable to pass water through the reaction tank in an upward flow with LV (for example, around 7 to 15 m/hr) that expands the fluidized bed by around 20 to 50%. Note that as a material of the carrier, gel substances, porous materials, nonporous materials and the like other than activated carbon can also be used under the similar conditions. For example, polyvinyl alcohol gel, polyacrylamide gel, polyurethane foam, calcium alginate gel, zeolite, plastic and the like can also be used. Use of activated carbon as the carrier enables removal of a wide-range of pollutants due to interaction of an adsorption action and a biodegradation action of the activated carbon.

An average particle size of the carrier is preferably around 0.2 to 3 mm. When the average particle size is large, high LV is enabled, and when a part of the treated water is circulated into the reaction tank, a high load is enabled because the circulation amount can be increased. However, since the specific surface area decreases, the amount of organisms decreases. When the average particle size is small, the carrier can fluidize with low LV, so that the pump power becomes inexpensive. In addition, since the specific surface area is large, the amount of adhering organisms increases.

An optimum particle size is determined by the concentration of wastewater, and when TOC is 50 mg/L, the optimum particle size is preferably around 0.2 to 0.4 mm, whereas when TOC is 10 mg/L, the optimum particle size is preferably around 0.6 to 1.2 mm.

A deployment rate of the fluidized bed is preferably around 20 to 50%. If the deployment rate is lower than 20%, clogging and short circuit may occur. If the deployment rate is higher than 50%, there arise the fear of flowout of the carrier, and the pump power cost increases.

With an ordinary biological activated carbon, an expansion rate of the activated carbon fluidized bed is around 10 to 20%, but in this case, a fluidizing state of the activated carbon is ununiform and the activated carbon fluidizes up, down, left, and right. As a result, the membrane simultaneously installed is rubbed by the activated carbon, and is worn away and consumed. In order to prevent this, it is necessary to fluidize the fluidized bed carrier such as activated carbon sufficiently in the present invention, and it is preferable to set the expansion rate at 20% or more. Accordingly, the particle size of the carrier is preferably smaller than ordinary biological activated carbon. In the case of activated carbon, the activated carbon is not limited to coconut shell charcoal, coal, charcoal and the like. While spherical charcoal is preferable in terms of shape, ordinary granular coal or crushed coal may be used.

<Oxygen-Containing Gas>

Oxygen-containing gas can be gas containing oxygen, such as air, oxygen-enriched air, and pure oxygen. Gas to be passed is preferably passed through a filter to remove fine particles in advance.

The gas passage amount is preferably equal to substantially twice the amount of oxygen required for a biological reaction. If the gas passage amount is smaller than this, BOD and ammonia remain in the treated water due to lack of oxygen, whereas if the gas passage amount is larger, not only the pressure loss becomes high but also the gas passage amount becomes unnecessarily large, so that economy is impaired.

Gas passage pressure is preferably slightly higher than pressure loss of the hollow fibers generated with a predetermined gas passage amount.

<Flow Velocity of Water to be Treated>

A flow velocity of the water to be treated in the reaction tank is LV 10 m/hr or more, and the water to be treated can be treated in one pass without circulation of treated water.

When LV is increased, the oxygen dissolution rate is enhanced proportionally. Oxygen is dissolved with LV 50 m/hr twice as much as with LV 10 m/hr. In the case of high LV, it is preferable not to increase the deployment rate too much by using activated carbon with a large particle size. From the amount of organisms, and oxygen dissolution rate, an optimum LV range is around 7 to 20 m/hr.

<Residence Time>

It is preferable to set a residence time so that a tank load is 1 to 2 kg-TOC/m$^3$/day.

<Blower>

The blower with a discharge wind pressure being equal to or less than water pressure coming from the water depth is sufficient. However, the discharge wind pressure needs to be equal to or larger than the pressure loss of the pipe or the like. Normally, pipe resistance is around 1 to 2 kPa.

In the case of a water depth of 5 m, a general-purpose blower with an output up to approximately 0.55 MPa has been used, and at a water depth equal to or more than 5 m, a high-pressure blower has been used in general.

In the present invention, even at a water depth of 5 m or more, a general-purpose blower with a pressure of 0.5 MPa or less can be used, and a low-pressure blower with 0.1 MPa or less is preferably used.

The conditions of supply pressure of the oxygen-containing gas are that the supply pressure is higher than the pressure loss of hollow fiber membranes, and is lower than the water depth pressure, and the membrane is not crushed with the water pressure. Concerning a flat membrane and a spiral membrane, the pressure loss of membrane can be ignored as compared with the water pressure, and therefore the supply pressure is extremely low pressure, approximately 5 kPa or more, the water pressure or less, and preferably 20 kPa or less.

In the case of the hollow fiber membrane, the pressure loss changes according to its inside diameter and length. The amount of air which is passed is 20 mL to 100 mL/day per membrane of 1 m$^2$, so that when the membrane length doubles, the amount of air doubles, and even if a membrane diameter doubles, the amount of air only doubles. Accordingly, the pressure loss of the membrane is directly proportional to the membrane length and inversely proportional to the diameter.

A value of the pressure loss is around 3 to 20 kPa in the hollow fiber having an inside diameter of 50 μm and a length of 2 m.

EXAMPLES

On discharge of condensed water from the hollow fiber membranes, the following experiments were performed.

Example 1

Tops and bottoms of 30 nonporous silicon hollow fiber membranes each having an inside diameter of 300 μm and an outside diameter of 500 μm were respectively bundled, and were installed in a column (transparent vinyl chloride tube) having a diameter of 25 mm and a length of 1 m, and air was passed at 10 mL/min from an upper part to a lower part. The bundled lower portions of the silicon hollow fibers protrude to a lower part of outside of the column.

Further, synthetic wastewater prepared by adding isopropyl alcohol by 100 mg/L to pure water was passed in an upward flow through the column so that the residence time was 20 minutes. By the operation of the apparatus, approximately 2 ml of condensed water was discharged in two weeks from the lower ends of the hollow fiber membranes protruded to the lower part of the column.

An oxygen dissolution rate of the oxygen dissolution membranes is shown in FIGS. 2(a) and 2(b). The oxygen dissolution rate of the oxygen dissolution membranes was substantially 8 g-O/m$^2$/day or more per 1 m$^2$, and stable for 140 days. The oxygen dissolution rate was less than 8 g-O/m$^2$/day around 70 days and 120 days, and this is estimated because the TOC concentration of the raw water temporarily decreased to reduce the load and the supply load itself was reduced, so that the driving force of the dissolution and dispersion of oxygen to the membrane decreased and the oxygen dissolution rate was reduced.

Comparative Example 1

The same test apparatus as in example 1 was used, and operated under the same conditions except that the passing direction of air is from a lower part to an upper part.

The oxygen dissolution rate of the oxygen dissolution membranes is shown in FIGS. 2(a) and 2(b). As in FIGS. 2(a) and 2(b), the oxygen dissolution rate started to reduce after approximately two weeks from the start of the operation, and decreased to around 2 g-O/m$^2$/day after 100 days.

Comparative Example 2

The same test apparatus as in example 1 except that one end of a fine tube was connected to an air outlet pipe in a column bottom portion, and the other end of the tube was disposed in a reaction tank upper portion was used, and operated under the same conditions. As a result, the oxygen dissolution rate was within a range of 3 to 4 g-O/m$^2$/day.

Example 2

In comparative example 2, a T-shaped pipe was attached to the other end of the tube, a pinch cock was attached to a part directly under the air outlet pipe, and condensed water was discharged by opening the pinch cock once every two weeks. As a result, the oxygen dissolution rate was restored to 9 g-O/m$^2$/day.

While the present invention is described in detail by using the specific mode, it is obvious to a person skilled in the art that various modifications can be made without departing from the intension and scope of the present invention.

The present application is based upon Japanese Patent Application No. 2018-025233 filed on Feb. 15, 2018, the entire contents of which are incorporated herein by reference.

REFERENCE SIGNS LIST

1 Aerobic biological treatment apparatus
2 Reaction tank
6 Oxygen dissolution membrane module
20, 21 Header
22 Hollow fiber membrane
27 Gas supply pipe
29 Discharge pipe (water drainage pipe)
30 Exhaust gas pipe
32 Tank

The invention claimed is:

1. An aerobic biological treatment apparatus comprising:
a reaction tank;
an oxygen dissolution membrane module installed in the reaction tank so that a gas passage direction is in an up-down direction;
oxygen-containing gas supply means for supplying oxygen-containing gas to the oxygen dissolution membrane module;
an exhaust gas pipe that discharges exhaust gas to outside of the reaction tank from the oxygen dissolution membrane module; and
a water drainage pipe that discharges condensed water to outside of the reaction tank from the oxygen dissolution membrane module, the water drainage pipe having a first portion arranged in the reaction tank and a second portion arranged outside the reaction tank,
one end of the exhaust gas pipe being connected to the first portion,
the exhaust gas pipe extending upwardly in the reaction tank so that another end of the exhaust gas pipe opens to the atmosphere above a water surface of the reaction tank.

2. The aerobic biological treatment apparatus according to claim 1, wherein the aerobic biological treatment apparatus is provided to discharge the condensed water to a position lower than a lower end of the oxygen dissolution membrane module, and discharge the condensed water discharged from the oxygen dissolution membrane module to outside of the tank.

3. The aerobic biological treatment apparatus according to claim 1, wherein the water drainage pipe is provided to be vertically downward or to have a downward gradient.

4. The aerobic biological treatment apparatus according to claim 1, further comprising a tank that receives the condensed water flowing out of the water drainage pipe, and a pump that feeds water in the tank to the reaction tank.

5. The aerobic biological treatment apparatus according to claim 1, wherein a valve is provided in the water drainage pipe.

6. The aerobic biological treatment apparatus according to claim 1, wherein an inside diameter of the water drainage pipe is 50 mm or less.

7. The aerobic biological treatment apparatus according to claim 1, wherein the oxygen dissolution membrane module includes a nonporous oxygen dissolution membrane.

8. The aerobic biological treatment apparatus according to claim 7, wherein the oxygen dissolution membrane is hydrophobic.

9. The aerobic biological treatment apparatus according to claim 1, wherein the reaction tank is filled with a fluidized bed carrier.

10. The aerobic biological treatment apparatus according to claim 1, further comprising a permeation plate in the reaction tank and a cleaning pipe disposed under the permeation plate.

11. An aerobic biological treatment apparatus comprising:
a reaction tank;
an oxygen dissolution membrane module installed in the reaction tank so that a gas passage direction is in an up-down direction;
oxygen-containing gas supply means for supplying oxygen-containing gas to the oxygen dissolution membrane module;
an exhaust gas pipe that discharges exhaust gas to outside of the reaction tank from the oxygen dissolution membrane module; and
a water drainage pipe that discharges condensed water to outside of the reaction tank from the oxygen dissolution membrane module, the water drainage pipe having a first portion arranged in the reaction tank and a second portion arranged outside the reaction tank,
one end of the exhaust gas pipe being connected to the second portion,
another end of the exhaust gas pipe opening to the atmosphere.

* * * * *